(No Model.) 6 Sheets—Sheet 2.

P. R. GRAY & P. R. GRAY, Jr.
REFRIGERATIVE APPARATUS.

No. 406,345. Patented July 2, 1889.

WITNESSES
H. C. Newman,
E. S. Newman.

By their Attorneys
Baldwin, Davidson & Wight.

INVENTORS
P. R. Gray
P. R. Gray Jr.

(No Model.) 6 Sheets—Sheet 3.

P. R. GRAY & P. R. GRAY, Jr.
REFRIGERATIVE APPARATUS.

No. 406,345. Patented July 2, 1889.

WITNESSES
H. C. Newman.
E. S. Newman.

INVENTORS
P. R. Gray
P. R. Gray Jr
By their Attorneys
Baldwin, Davidson & Wight.

(No Model.) 6 Sheets—Sheet 4.

P. R. GRAY & P. R. GRAY, Jr.
REFRIGERATIVE APPARATUS.

No. 406,345. Patented July 2, 1889.

WITNESSES
H. C. Newman,
E. S. Newman.

INVENTORS
P. R. Gray,
P. R. Gray Jr.
By Their Attorneys
Baldwin, Davidson & Wight.

(No Model.) 6 Sheets—Sheet 5.

P. R. GRAY & P. R. GRAY, Jr.
REFRIGERATIVE APPARATUS.

No. 406,345. Patented July 2, 1889.

WITNESSES
H. C. Newman
E. S. Newman

INVENTORS
P. R. Gray
P. R. Gray Jr.
By their Attorneys
Baldwin, Davidson & Wright (No Model.) 6 Sheets—Sheet 6.

P. R. GRAY & P. R. GRAY, Jr.
REFRIGERATIVE APPARATUS.

No. 406,345. Patented July 2, 1889.

WITNESSES INVENTORS

UNITED STATES PATENT OFFICE.

PHILANDER R. GRAY AND PHILANDER R. GRAY, JR., OF ELIZABETH, NEW JERSEY.

REFRIGERATIVE APPARATUS.

SPECIFICATION forming part of Letters Patent No. 406,345, dated July 2, 1889.

Application filed May 10, 1888. Serial No. 273,499. (No model.)

*To all whom it may concern:*

Be it known that we, PHILANDER R. GRAY and PHILANDER R. GRAY, Jr., citizens of the United States, residing at Elizabeth, in the county of Union and State of New Jersey, have jointly invented certain new and useful Improvements in Refrigerative Apparatus, of which the following is a specification.

Our invention relates to systems working according to the evaporation and absorption method, in which aqua-ammonia or like cooling agent is employed.

The general operation herein described is well known and will not need elaborate description.

Our invention relates more especially to certain improvements in the still; to the manner of regulating the pump which maintains the circulation of the cooling agent or the aqua-ammonia; to an arrangement in which the weak ammonia discharging into the absorber is caused by an injector-like or aspirating action to draw the expanded gas from the cooler, and to other features of the apparatus, all as hereinafter claimed.

Figure 1:
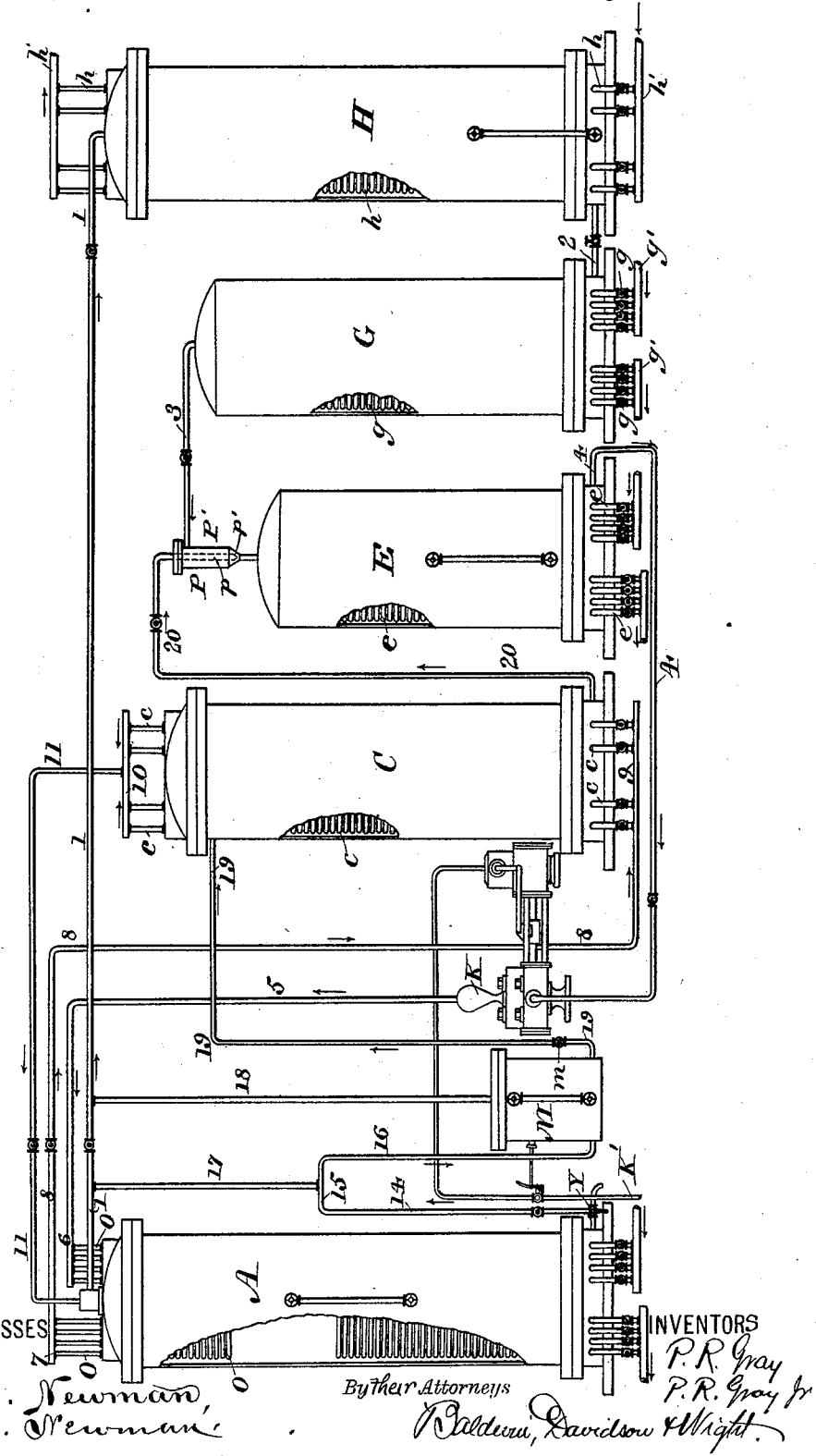
Figure 2:
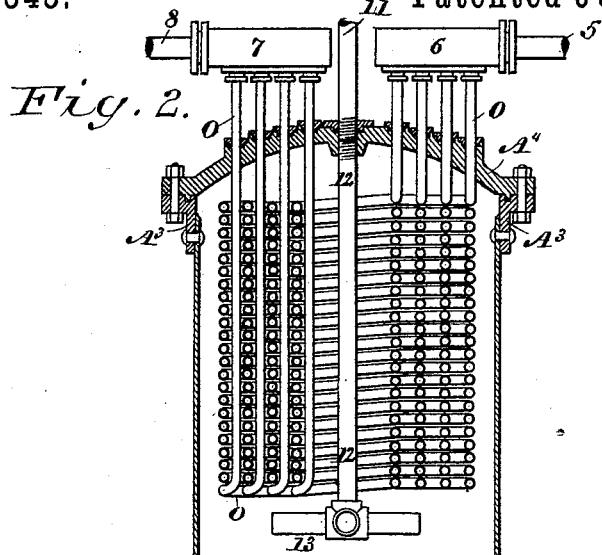
Figure 3:
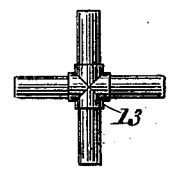
Figure 4:
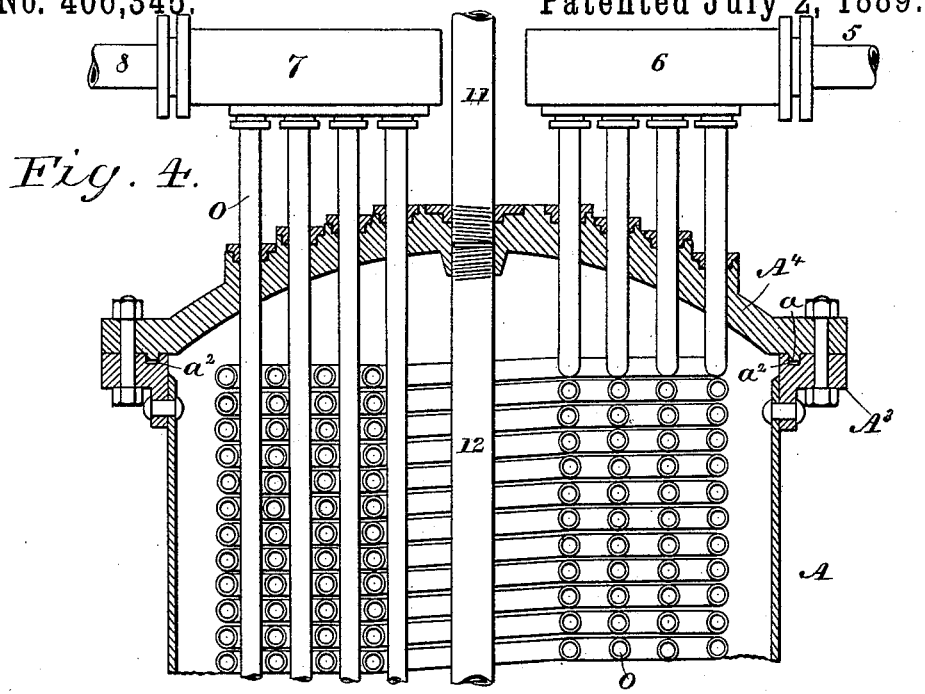
Figure 5:
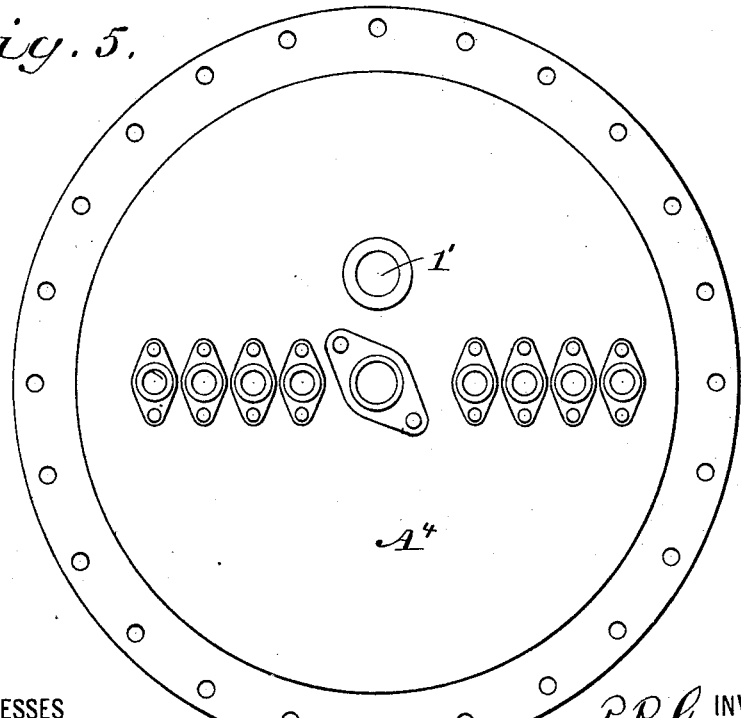
Figure 6:
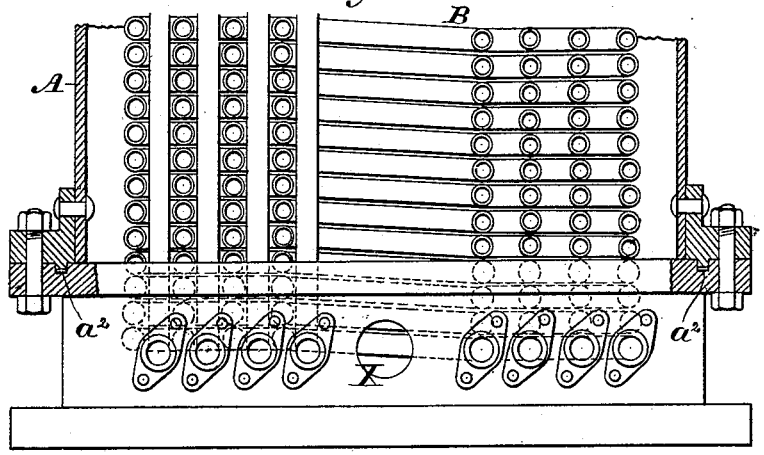
Figure 7:
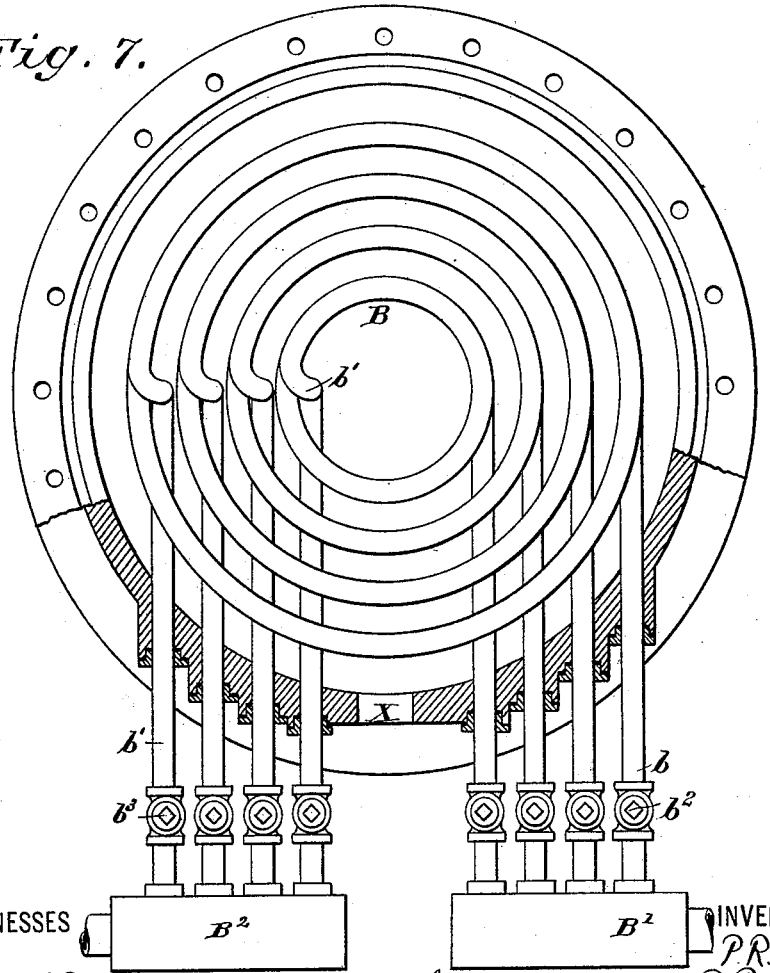
Figure 9:
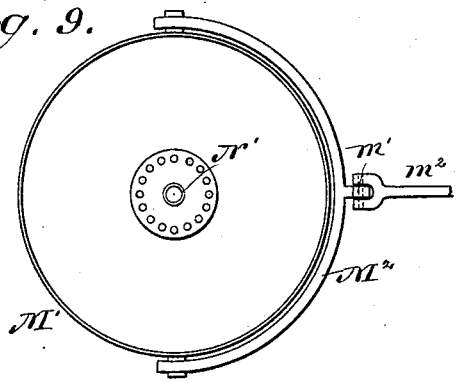
Figure 8:
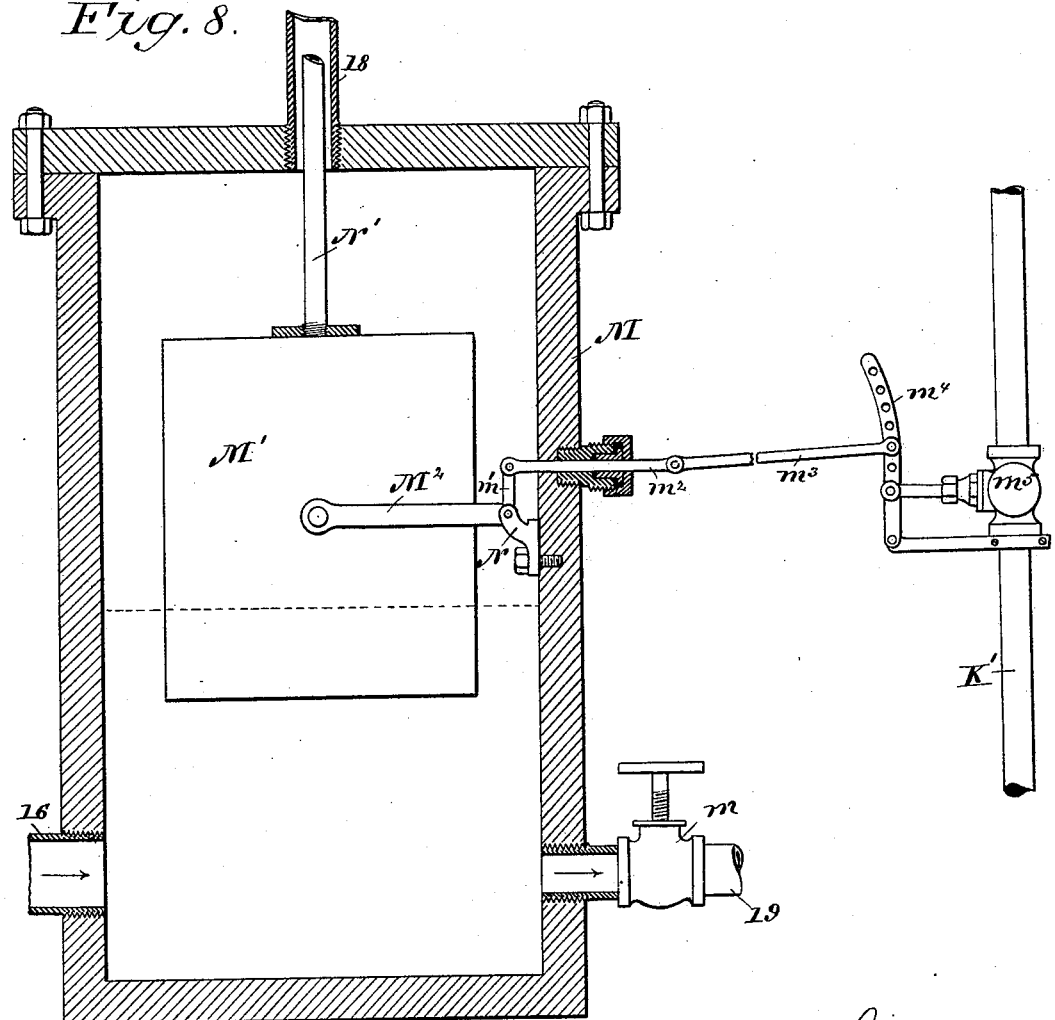
Figure 10:
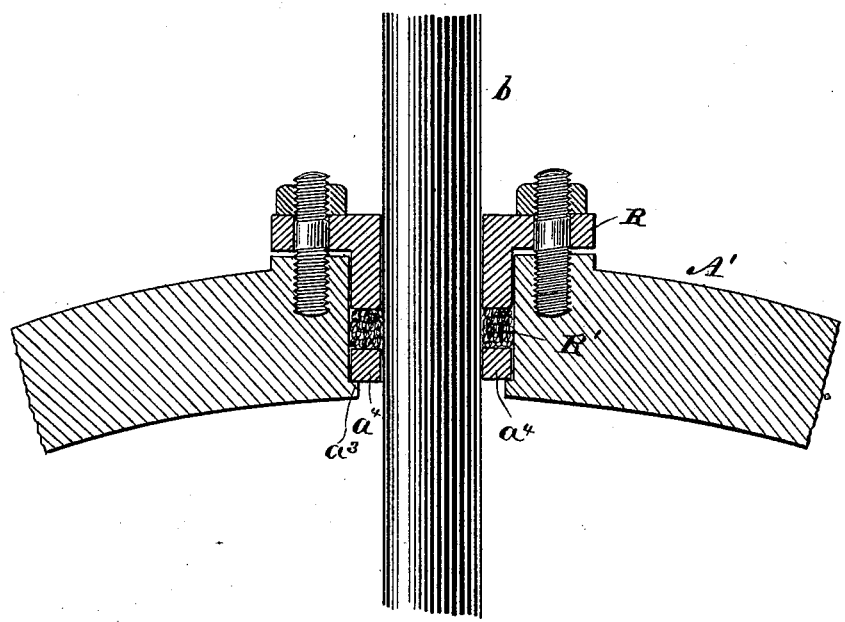
Figure 11:
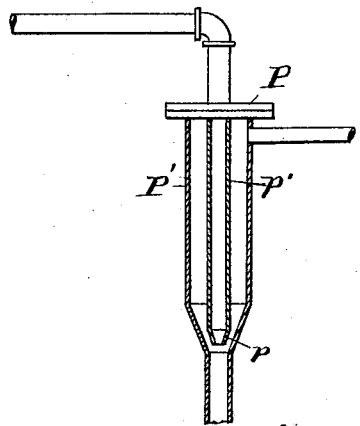

In the accompanying drawings, Figure 1 is a diagrammatic view illustrating the general organization of the system, some of the vessels having their walls broken away to show the arrangement of the pipe-coils within; Fig. 2, a vertical section through the still; Fig. 3, a detail of the sprinkler through which the strong ammonia is delivered into the still; Fig. 4, a vertical central section of the upper part of the still on a somewhat enlarged scale; Fig. 5, a plan of the top plate or cover of the still; Fig. 6, an elevation of the lower end of the still, partly in section; Fig. 7, a plan view of the still with the cover removed and the wall partly broken away to show the base-piece through which the lateral ends or connections of the pipe-coils pass to the manifolds; Fig. 8, a sectional view showing the regulator by which the weak ammonia from the still is caused to control the pump; Fig. 9, a detail plan of the regulator-float; Fig. 10, a detail sectional view of the packing-box for the various steam and other pipes of the system; and Fig. 11 is a detail view showing the aspirator device through which the weak ammonia discharges into the absorber.

Referring to Fig. 1, A represents the ammonia-still; C, the exchanger, where the weak ammonia leaving the still gives up its heat to the strong ammonia entering the still; E, the absorber; G, the cooler or refrigerating-vessel; H, the condenser; K, the pump for maintaining the circulation of the system, and M the regulator for controlling the speed of the pump.

The circulation of the aqua-ammonia and gas is as follows: The ammonia-gas leaves the still by a pipe 1, which is connected with top plate of still at 1', Fig. 5, and passes into the shell of the condenser H, which contains a series of independent cooling-pipe coils $h$, each of which is connected at top and bottom of condenser with manifolds $h'$ $h'$. The cold water or other cooling agent enters at the lower manifold and leaves at the upper one, as indicated. The gas condenses in the shell H and the liquid anhydrous ammonia collects in the bottom thereof and passes through a pipe 2, having a suitable regulating-cock, to the refrigerative chamber G, in which it expands and cools or freezes the brine, oil, or other fluid circulating in the pipe-coils $g$ therein. These coils enter and leave the base of the chamber, being connected with manifolds $g'$. The expanded gas leaves the refrigerative chamber at the top and passes by pipe 3 to the absorber to meet and reunite with the weak ammonia from the still, as presently described. The recombined weak ammonia and gas, or, in other words, the now strong ammonia, is drawn from the absorber through pipe 4 to the pump K, from whence it is forced through pipe 5 to a manifold coupling 6 and through multiple coils O, arranged in the upper part of the still A, as shown in the detail views, and as particularly described hereinafter, to a manifold 7, thence by pipe 8 to the manifold 9 of multiple coils $c$, entering the base of the exchanger through said coils to their manifold 10 at the top of the exchanger, and thence by pipe 11 into top of the still through the central pipe 12, Figs. 2 and 3, and sprinkler 13. The purpose of carrying the cold strong ammonia through multiple coils in top of still prior to its passage through the exchanger is to provide a condensing-coil in still to throw down any aqueous vapor that might otherwise pass off with the ammonia-gas. The strong ammonia is thereby only slightly increased in temperature, and subsequently in its passage through the exchanger it takes the heat from the outgoing weak ammonia, and then finally enters the still for redistillation, as is well understood.

The course of the weak ammonia from which the gas has been driven off and passed through the system, as above described, will now be traced. It leaves the base of the still by a vertical pipe 14, the height of which regulates the level of the aqua-ammonia in the still, and, overflowing through horizontal pipe or bend 15, descends pipe 16 to the regulator M, the detailed construction of which is shown in Figs. 8 and 9, to which attention is now invited; but first it should be noted that vertical pipes 17 and 18, respectively, connect the pipes 14, 15, and 16 and the interior of the regulator with the ammonia-gas pipe 1, and consequently the vapor-pressure within the still is uniformly distributed through these connections. The weak ammonia enters the regulator by pipe 16 and leaves it to pass to the exchanger C by pipe 19, which has a regulating-cock $m$. The outflow at the pipe 19 will be practically uniform irrespective of the level of the weak ammonia in the regulator, which may be indicated by the dotted line. If, therefore, the quantity of strong ammonia pumped into the still, as above described, is just sufficient to compensate for the weak ammonia leaving the still, the level of the weak ammonia in the regulator will remain the same. If, however, the pump is acting too rapidly, more liquid will enter the regulator than leaves it, and the level will rise therein. Within the regulator is a float $M'$, hinged by a bail-connection $M^2$, having a vertical arm $m'$ in a bracket N. The vertical arm $m'$ is pivotally connected with a pitman $m^2$, passing through a suitable stuffing-box, and hinged to a connecting-rod $m^3$, jointed to a rocking cut-off lever $m^4$, which controls the cut-off valve $m^5$ of the pump steam-supply pipe $K'$. Consequently a rise of the weak ammonia in the regulator proportionally reduces the speed of the pump, and a fall correspondingly increases it. A uniform circulation is therefore automatically maintained. The float shown is hollow and carries a vertical pipe $N'$, which works in the pipe 18, thus serving as a guide for the float. It also, being open, distributes the gas-pressure in the regulator and pipe 18 to the interior of the float. The weak ammonia is delivered by the pipe 19 to the top of the exchanger C, passing over the coils $c$ therein, gives up its heat to the strong ammonia which is moving upwardly through said coils on its way to the still. The weak ammonia being under the gaseous pressure of the still is further forced from the bottom of the exchanger up pipe 20 to the aspirator P. (Shown in Fig. 1 and in detail in Fig. 11.) The nozzle $p$, through which the weak ammonia is delivered, enters a jacket $P'$, with which the gas-pipe 3 from the refrigerative chamber is connected, and projects slightly into the aperture $p'$, leading into the shell of the absorber E. The discharge of the weak ammonia through nozzle $p$ tends to reduce pressure in the refrigerative chamber, thus drawing the gas therefrom and facilitating the expansion of the liquid anhydrous ammonia therein. Coils $e$, in which cold water or other cooling agent circulates, enter and leave the base of the absorber, and the weak ammonia and gas therein, under the combined effects of pressure and reduced temperature, combine to form strong ammonia, which is taken by pipe 4 to the pump, and thence to still, as fully described.

The general operation, as well as particular organizations in which we have chosen to illustrate features of our invention having now been fully described, we will refer specially to the construction of the still. It has a flat solid base $A'$, which may be permanently mounted on a suitable foundation, the connections of the steam-coils being all formed laterally, as presently described. The base, which may be cast in one piece, has a horizontal flange $a$, with an annular groove $a'$ therein, upon which the correspondingly-flanged cast ring $A^2$, having a rib fitting the groove $a'$, is seated and bolted, as shown. A washer $a^2$, Fig. 6, may be seated in the groove to insure a perfectly close joint. The shell A of the still is securely riveted to the ring $A^2$. The upper end of the shell carries a flanged cast ring $A^3$, which receives the cover $A^4$, an interlocking joint $a$ and washer $a^2$, similar to that at the bottom of the still, being shown. The multiple coils O, as well as pipe 12, pass through suitable packing-boxes in the cover. Obviously by disconnecting the pipes 5 and 8 from the manifolds 6 and 7 and the pipes 11 and 1 from the cover, and unscrewing the cover-bolts, the cover, and with it the coils O, may be removed. The shell may also be disconnected and lifted from the base, thus exposing and giving free access to the steam-coils B therein. The coils, which are entirely independent of each other, each have one end $b$ connected with a manifold $B'$, from which they enter the base laterally through suitable packing-boxes, hereinafter described. They are coiled vertically concentrically in the still, and the opposite ends $b'$ are then turned down and also carried through the base $A'$ laterally to the manifold $B^2$. Each coil has an independent inlet-cock $b^2$ and outlet-cock $b^3$. Any coil may thus be shut off, either because of a defect therein or to regulate the amount of work being done. X in Figs. 2, 6, and 7 indicates the aperture in the base of the still with which the weak-ammonia-discharge pipe 14 is connected, and Y indicates a two-way cock in pipe 14, by which the still may be emptied when desired.

The special construction of packing-box which we prefer to use is shown in Fig. 10, in which $A'$ may represent the wall of the base of the still, and $b$ the lateral end of a pipe-coil B. The opening in the base A' is considerably larger than the pipe, and is formed with an annular shoulder $a^3$, upon which a washer $a^4$, closely fitting the pipe and opening, is seated. R indicates any suitable gland, and R' packing material. This construction of packing-box is preferred because it permits of the ready insertion and withdrawal of the steam-pipes. The pipe is easily inserted into the enlarged opening in the base and is then centered by the washer.

Stills thus constructed can readily be disassembled without disturbing the general pipe system by merely disconnecting the pipes above mentioned, and the several steam-coils B' may be removed and replaced with but slight trouble or delay and without disturbing the base. All the various pipes are provided with cocks or valves at suitable points, as shown in Fig. 1, by which the flow of the liquid or gas therein may be regulated.

We do not undertake to recite modifications of structure, which may doubtless readily be made by those skilled in the art; but so far as the float device in the regulator is concerned any of the well-known arrangements by means of which a change of fluid-level is caused to operate a controlling-valve may be employed.

We may use in our system ordinary commercial aqua-ammonia, which has a strength of 26° Baumé, and produce economical and efficient results.

We claim as our invention—

1. The combination, with the circulating-pipes and essential apparatus of an evaporation and absorption refrigerative system, of a still having a removable shell, a fixed base, multiple steam coils arranged within the still and supported by the base, and pipe-connections extending laterally through the fixed base by which the pipe-coils are connected with the steam supply and discharge pipes, substantially as set forth.

2. The combination of the still having a removable shell, a fixed base, independent multiple steam-coils arranged within the still upon the base, pipe-connections which connect each coil with steam supply and discharge pipes and extend laterally through enlarged openings in the base, packing-rings $a^3$, arranged in said openings and embracing the pipes, and a gland or follower, substantially as set forth.

3. The combination of the fixed base of the still, the steam-coils, the removable shell, the removable cover, and the aqueous-vapor-condensing coils carried by the cover and removable therewith, substantially as set forth.

4. The combination of the still, its cover, the concentrically-coiled aqueous-vapor-condenser coils arranged in the top of the still, through which the cold strong ammonia passes, the pipe 8, leading the strong ammonia from said coils to the exchanger, and the pipes 11 and 12, returning the strong ammonia from the exchanger into the still, the latter extending down into the still through the center of said coils, substantially at set forth.

5. The combination of the fixed still-base, the independently-removable multiple steam-coils arranged upon the base, the removable shell, the removable cover, and the independently-removable multiple aqueous-vapor-condenser coils carried by the cover and all removable therewith, substantially as set forth.

6. The combination of the still, the gas-outlet pipe 1, the weak-ammonia-discharge pipes 14, 15, and 16, the regulator M, and the pressure-equalizing pipes 17 and 18, extending, respectively, from the gas-outlet pipe 1 to the pipe 15 and from the gas-outlet pipe to the regulator, substantially as and for the purpose set forth.

7. In an absorption refrigerative system, the combination of the still and circulating pipe system, the regulator through which the weak ammonia passes on its way from the still, the float therein, a pressure-equalizing pipe-connection connecting the interior of the regulator with the top of the still, the pump for supplying strong ammonia to the still, its steam-supply pipe and valve, and connections between the float and valve, whereby the speed of the pump is regulated by the level of the weak ammonia in the regulator.

8. The combination, in the regulator, of the hollow float, the pipe-guide N, and the pipe 18, in which it works, connected with the gas-outlet pipe leading from the still, substantially as set forth.

9. The combination of multiple pipe-coils, a base having a fixed bottom upon which the pipe-coils rest, and lateral openings through which the ends or inlet and outlet connections of each coil pass, inlet and outlet manifolds with which the ends of the coils are connected outside of the still, and the detachable removable shell enveloping the coils and supported upon the base.

In testimony whereof we have hereunto subscribed our names this 8th day of May, A. D. 1888.

PHILANDER R. GRAY.
PHILANDER R. GRAY, JR.

Witnesses:
WILLIAM B. MASON,
WILLIAM TH. OVERBECK.